US006182213B1

(12) United States Patent
Klein

(10) Patent No.: US 6,182,213 B1
(45) Date of Patent: *Jan. 30, 2001

(54) METHOD FOR ATTACHMENT OF A BIOS DEVICE INTO A COMPUTER SYSTEM USING THE SYSTEM MEMORY DATA BUS

(75) Inventor: Dean A. Klein, Eagle, ID (US)

(73) Assignee: Micron Electronics, Inc., Nampa, ID (US)

( * ) Notice: Under 35 U.S.C. 154(b), the term of this patent shall be extended for 0 days.

This patent is subject to a terminal disclaimer.

(21) Appl. No.: 08/940,743

(22) Filed: Sep. 30, 1997

(51) Int. Cl.[7] .................................................. G06F 9/445
(52) U.S. Cl. .................................... 713/2; 710/126
(58) Field of Search ............................. 713/2; 714/36; 711/170, 200; 710/126

(56) References Cited

U.S. PATENT DOCUMENTS

| 4,933,845 | 6/1990 | Hayes . |
| 5,193,170 | 3/1993 | Lam . |
| 5,414,820 | 5/1995 | McFarland et al. . |
| 5,450,458 | 9/1995 | Price et al. . |
| 5,457,785 | 10/1995 | Kikinis et al. . |
| 5,473,775 | * 12/1995 | Sakai et al. ............................ 713/2 |
| 5,522,076 | 5/1996 | Dewa et al. . |
| 5,559,966 | 9/1996 | Cho et al. . |
| 5,584,040 | 12/1996 | Curt et al. . |
| 5,594,874 | 1/1997 | Narayanan et al. . |
| 5,596,735 | 1/1997 | Hervin et al. . |
| 5,596,740 | 1/1997 | Quattromani et al. . |
| 5,623,691 | 4/1997 | Clohset et al. . |
| 5,657,285 | 8/1997 | Rao . |
| 5,680,556 | * 10/1997 | Begun et al. ............................ 713/2 |
| 5,680,620 | 10/1997 | Ross . |
| 5,721,882 | 2/1998 | Singh . |
| 5,740,381 | 4/1998 | Yen . |
| 5,740,387 | 4/1998 | Lambrecht et al. . |
| 5,778,431 | 7/1998 | Rahman et al. . |
| 5,787,306 | 7/1998 | Michael . |
| 5,794,054 | 8/1998 | Le et al. . |
| 5,802,324 | 9/1998 | Wunderlich et al. . |
| 5,802,393 | * 9/1998 | Begun et al. ............................ 710/10 |
| 5,809,262 | 9/1998 | Potter . |
| 5,822,768 | 10/1998 | Shakkarwar . |
| 5,826,015 | 10/1998 | Schmidt . |
| 5,835,760 | * 11/1998 | Harmer .................................... 713/2 |
| 5,835,960 | 11/1998 | Keene et al. . |
| 5,857,086 | 1/1999 | Horan et al. . |
| 5,859,989 | 1/1999 | Olarig et al. . |
| 5,892,943 | * 4/1999 | Rockford et al. ........................ 713/2 |
| 5,905,888 | * 5/1999 | Jones et al. .............................. 713/2 |
| 5,951,685 | * 9/1999 | Stancil .................................... 713/2 |
| 5,961,643 | * 10/1999 | Klein ...................................... 713/2 |
| 5,987,551 | * 11/1999 | Klein .................................... 710/126 |
| 6,003,103 | * 12/1999 | Klein .................................... 710/126 |
| 6,009,522 | * 12/1999 | Klein ...................................... 713/2 |

OTHER PUBLICATIONS

Intel data sheets for 28F200BX–T/B and 28F002BX–T/B, at least as early as Jun. 4, 1997.

* cited by examiner

Primary Examiner—William Grant
Assistant Examiner—Nguyễn Xuân Nguyên
(74) Attorney, Agent, or Firm—Knobbe, Martens, Olson & Bear, LLP

(57) ABSTRACT

Chipset or core logic for attachment of the ROM BIOS within the system architecture. Although normally attached to the ISA bus, the ROM BIOS may be attached to an alternate bus (e.g., the system memory data bus) located within the system, thereby potentially eliminating the ISA bus from the computer system.

12 Claims, 4 Drawing Sheets

METHOD FOR ATTACHMENT OF A BIOS DEVICE INTO A COMPUTER SYSTEM USING THE SYSTEM MEMORY DATA BUS

RELATED APPLICATIONS

This application is related to the following patent applications, filed on even date herein: U.S. Ser. No. 08/940,214, now U.S. Pat. No. 5,987,551, entitled "Attachment or Integration of a BIOS Device Into a Computer System Using Local Bus;" U.S. Ser. No. 08/940,215, now U.S. Pat. No. 6,003,103, entitled "Method for Attachment or Integration of a BIOS Device Into a Computer System Using a Local Bus;" U.S. Ser. No. 08/941,663, now U.S. Pat. No. 6,076,118, entitled "Attachment or Integration of a BIOS Device into a Computer System Using the System Memory Address and Data Bus;" U.S. Ser. No. 08/941,664, now U.S. Pat. No. 5,961,643, entitled "Method for Attachment or Integration of a BIOS Device Into a Computer System Using the System Memory Address and Data Bus; " and U.S. Ser. No. 08/941,619, now U.S. Pat. No. 6,009,522,entitled "Attachment or Integration of a BIOS Device Into a Computer System Using the System Memory Data Bus;"

This application incorporates by reference, U.S. Ser. No. 08/940,215, now U.S. Pat. No. 6,003,103, entitled "Method for Attachment or Integration of a BIOS Device Into a Computer System Using a Local Bus;" and U.S. Ser. No. 08/941,664, now U.S. Pat. No. 5,961,643, entitled "Method for Attachment or Integration of a BIOS Device Into a Computer System Using the System Memory Address and Data Bus.

FIELD OF THE INVENTION

The present invention relates generally to the use of the ROM BIOS in a personal computer. More particularly, the present invention relates to the manner in which the ROM BIOS is integrated into or attached to the computer system.

BACKGROUND

Over the past fifteen years, continual advances in microprocessor technology have pushed the performance of personal computers to increasingly higher levels. New applications for personal computers have required significant processing power, and also have required significant amounts of data to be transferred between the computer's central processing unit and peripheral devices. This has prompted attempts to improve the manner in which peripheral devices communicate with the processor. And as a result, many changes have been made to the manner in which peripheral devices and the like are attached to the processor.

Normally, peripheral devices communicate with the processor through some form of an expansion bus. One of the earliest bus architectures used for personal computers is what has become known as the AT Attachment or the Industry Standard Architecture (ISA) bus. Over the years, however, additional expansion bus architectures have been developed, some of which have become part of mainstream personal computing. These additional architectures include IBM's Micro Channel Architecture (MCA) bus, and the Extended ISA bus (EISA) bus. More recently, local bus architectures, such as the VL bus architecture and the Peripheral Component Interconnect (PCI) bus architecture, have become a standard feature in modern personal computers.

As the evolution of expansion busses has progressed, peripheral devices once attached to the ISA bus (or some other legacy bus) have been moved to more modern and higher performance buses, such as the PCI bus. For example, it is now common for the video controller and the hard drive controller, once found on the ISA bus, to be attached to the higher-performance PCI bus.

Nevertheless, most modern computers still typically include the legacy ISA bus for accommodating other older, legacy devices. Although many peripherals are no longer attached to the ISA bus, one common device that does remain on the ISA bus is the ROM BIOS. This device has remained on the ISA bus for a number of reasons, including the fact that moving it to another bus is not easily accomplished. Thus, a need exists for moving the ROM BIOS to a different bus.

SUMMARY

In some embodiments of the present invention, the ROM BIOS is relocated to another bus within the system architecture. For systems where the ROM BIOS is the last remaining device on the ISA bus, this move potentially eliminates the need for the ISA bus and/or associated circuitry. Thus, the present invention may allow peripheral devices to be consolidated on a smaller number of busses, and potentially, on a single bus. This consolidation may reduce the cost and complexity of personal computers. In addition, relocating the ROM BIOS to an alternate point within the system may in some circumstances improve performance.

For example, in one embodiment, the present invention is a computer comprising a central processing unit, a memory bus that includes a memory data bus, a BIOS device that is connected to the memory data bus, and core logic that is connected to the central processing unit and the memory bus. The core logic controls memory operations involving the central processing unit, and controls BIOS operations involving the central processing unit and the BIOS device over the memory data bus. Additional embodiments and features, and the nature of the present invention may be more clearly understood by reference to the following detailed description of the invention, the appended claims, and to the several drawings herein.

DETAILED DESCRIPTION

Figure 1:
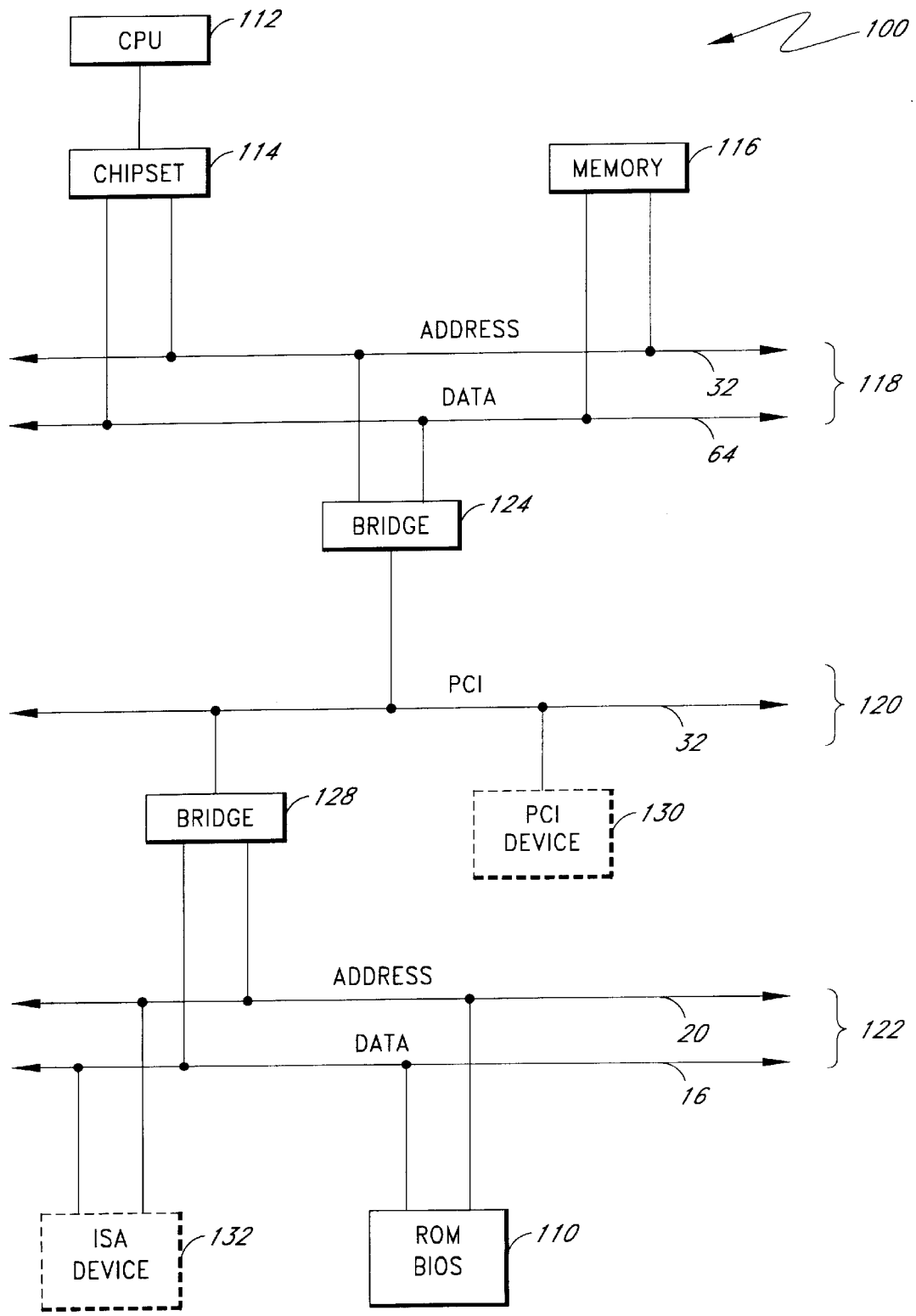
FIG. 1 is a block diagram of a prior art personal computer employing an ISA bus, a PCI bus, and also a system memory bus.

FIG. 1 is a block diagram of a prior art x86 personal computer 100, including a processor 112 and a chip set or core logic 114. The processor 112 is connected to the system memory bus 118 by the chip set 114. Typically, in a computer based on Intel's Pentium, the memory bus 118 has a 32-bit address bus and also a 64-bit data bus. In the embodiment shown, the computer 100 also includes two additional busses, the Peripheral Component Interconnect (PCI) bus 120 and the Industry Standard Architecture (ISA) bus 122.

The PCI bus 120 is a typically a 32-bit bus on which data and address signals are multiplexed. (The PCI bus 120 can be extended to 64 bits.) The PCI bus is essentially a mezzanine bus that is connected to the system memory bus 118 through bridge logic 124. A PCI peripheral device 130, which might be a video adapter or hard disk drive controller, is shown attached to the PCI bus in FIG. 1. The PCI bus 120 is also connected to the ISA bus 122 in FIG. 1 through the ISA bridge 128.

The ISA bus 122 shown in FIG. 1 is the standard bus found in almost every IBM-compatible computer manufactured in the last fifteen years. The ISA bus 122 includes a 20-bit address bus and a 16-bit data bus. Attached to the ISA bus 122 is an ISA peripheral device 132. Also connected to the ISA bus 122 is the ROM BIOS 110. As is well known in the art, stored in the ROM BIOS are various support routines and data used at power-up, as well as I/O support routines for accessing the keyboard, the graphics adapter, and other devices.

Often the ROM BIOS 110 in FIG. 1 is implemented by a non-volatile, electrically block-erasable, programmable read-only memory device (e.g., a FLASH memory device). Such a device can be periodically erased and rewritten, thereby permitting re-programming of the BIOS region. ROM BIOS access can be very slow, particularly where a FLASH ROM is used. For this reason, the BIOS routines are usually switched out of the ROM device it initially occupies, and into faster "shadow" memory (e.g., DRAM) at the same addresses. The contents of the ROM BIOS may be compressed, so it may be necessary to decompress it as it is moved into shadow RAM. The movement of the BIOS into shadow RAM typically takes place just after system reset, and once complete, the ROM device is generally not accessed again until a system reset. Once BIOS is shadowed, all accesses to the BIOS are directed to shadow RAM, rather than the ROM device. Because this shadow RAM is significantly faster than the ROM device, access to the BIOS routines is much faster.

The BIOS routines which may be stored in the device 110 in FIG. 1 are generally required to be accessible only to the CPU and, in a 32-bit address space, are addressed at the top 256 Mb of memory space (since that is where the CPU starts after a reset) and in the top 128 Kb of the low 1 megabyte of memory space. For 32-bit memory addresses where a memory cycle is indicated by a MEMCYCLE signal, and where a ROMEN signal indicates whether access to the ROM BIOS device is enabled, an access to a BIOS routine can be detected when the following expression evaluates to a logical one:

MEMCYCLE*(A31*A30*A29*A28+/
(A31::A20)*A19*A18*A17*ROMEN), where "Axx" corresponds to address bit "xx." The signal ROMEN would be controlled by bits in the configuration registers 190 for the chipset 114. (See FIG. 2.) After system reset, read access to the ROM device is permitted and writes are permitted in the same addresses in the shadow RAM, which allows the move/decompress operation to take place. Once shadowing has occurred, the ROM would no longer be accessible. However, read operations to the corresponding shadow RAM address space would be permitted, but write operations to this region of RAM would be prohibited. (Note that during programming of the (FLASH) ROM BIOS device, erasure or write operations can be performed on the ROM device.)

The shadowing procedure known in the art and described above avoids subsequent accesses to the ROM device after its contents are shadowed to faster RAM, but this shadowing procedure does not eliminate the need for the ROM device. The ROM device still will typically be required so that the BIOS routines can be stored in a non-volatile manner. These BIOS routines must also be accessible by the CPU, which has traditionally required an ISA bus. Yet the ROM BIOS may be one of the only devices on the ISA bus, so the ROM BIOS and the other support it requires (e.g., the ISA bus and associated logic) can require a significant amount of hardware, and can account for a non-trivial percentage of the cost of a computer system. In some embodiments, the present invention moves the ROM BIOS to another bus within the computer system, thereby eliminating the ROM BIOS' dependence on the ISA bus. In some computer systems, this will allow the ISA bus to be eliminated from the system entirely, saving significant costs.

Figure 2:
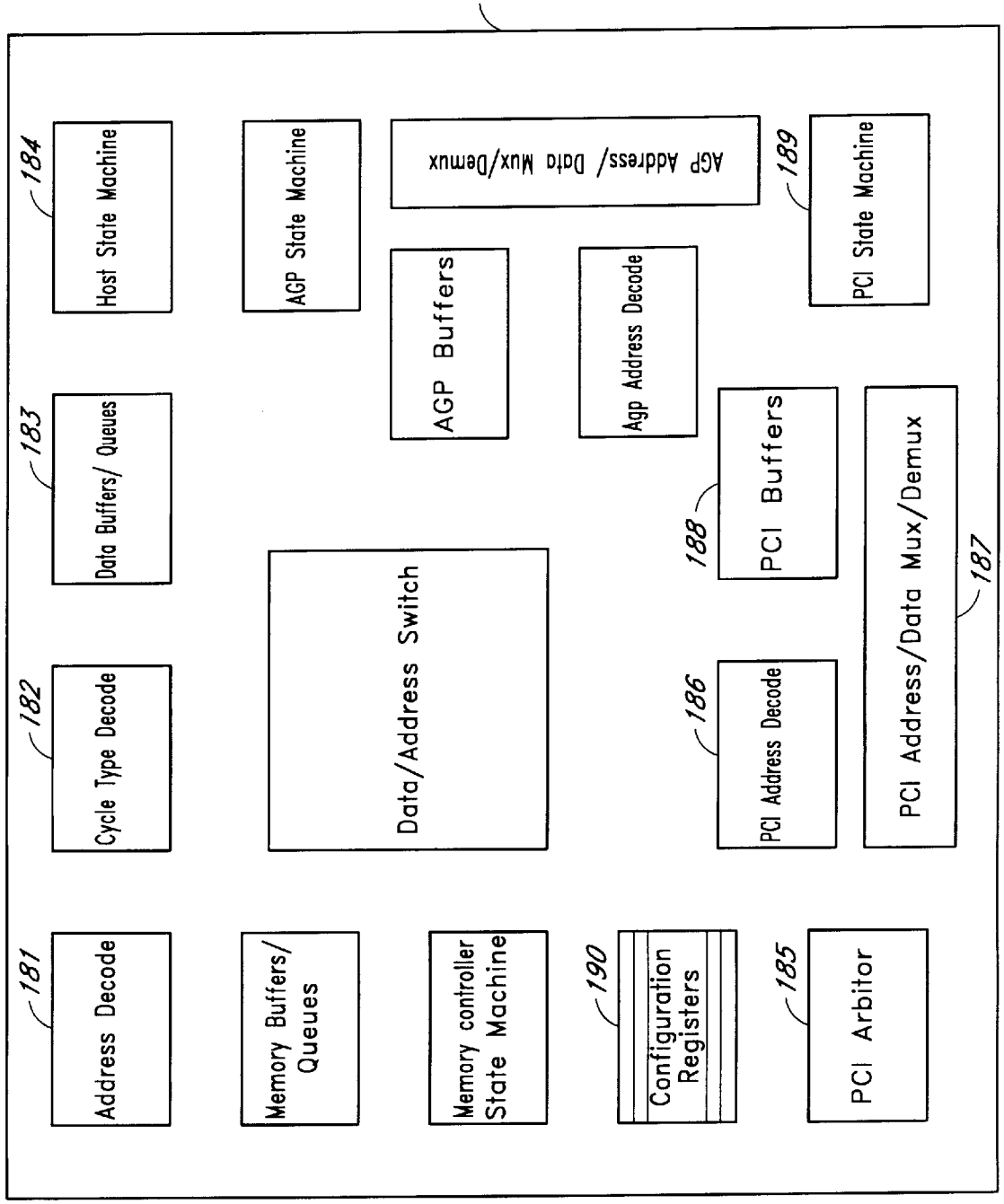
FIG. 2 is a block diagram of the components of the core logic or chipset typically used in modern personal computers.

FIG. 2 is a block diagram of the chip set or core logic 114 used in some embodiments of the present invention. The chip set 114 includes logic for address decoding 181, logic for cycle type decoding 182, data buffers 183, and a host state machine 184. Numerous other logic modules are also shown in FIG. 2, including modules for PCI arbitration 185, PCI address decoding 186, PCI Address/Data Mux/Demux 187, PCI Buffers 188, and a PCI State Machine 189. The chip set 114 or core logic is often constructed of multiple discrete parts, each of which includes one or more of the modules shown in FIG. 2. However, the same functionality could be obtained in another embodiment by integrating one or more of these separate modules into a single part.

Figure 3:
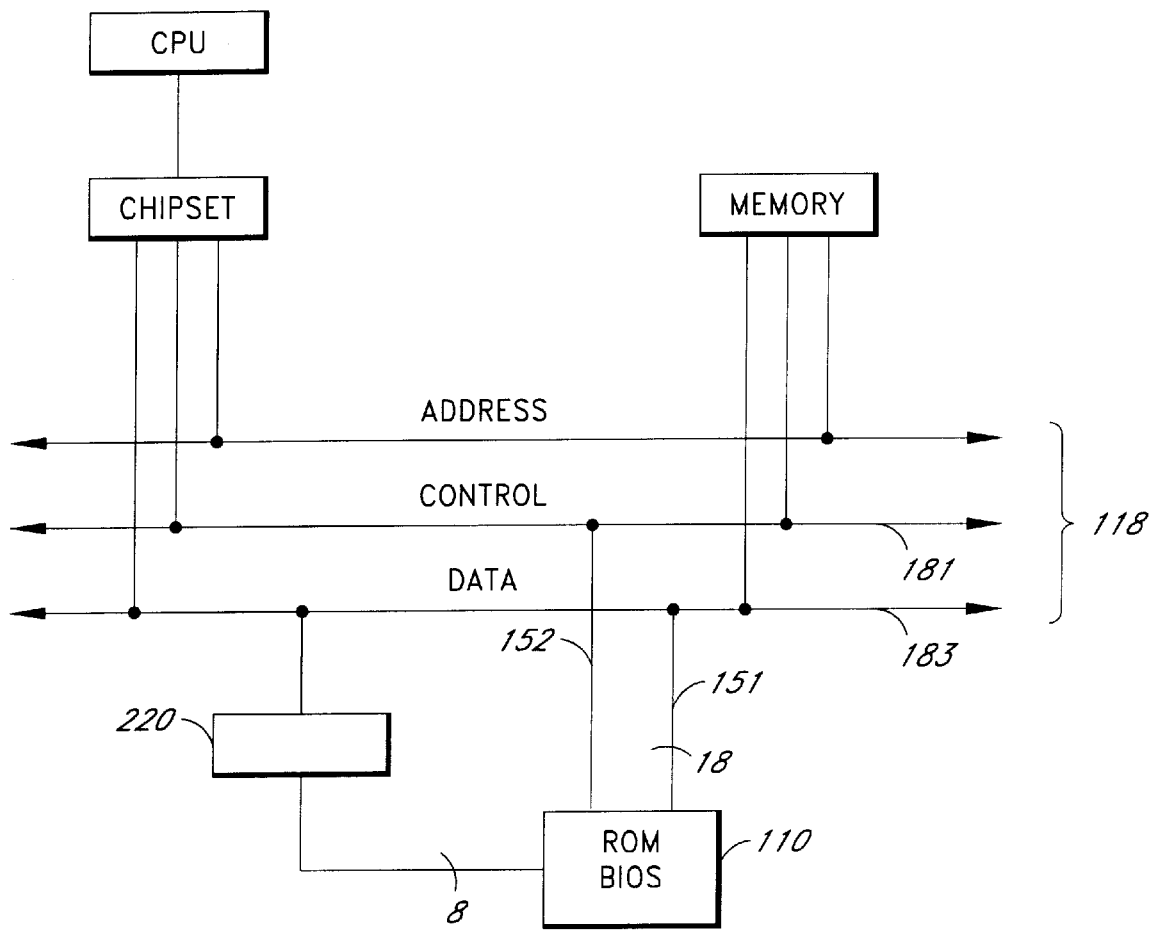
FIG. 3 is a block diagram of a personal computer where the ROM BIOS is attached to the system memory bus.

FIG. 3 shows a block diagram of a personal computer based on an x86-based processor. In the embodiment shown, the ROM BIOS 110 is attached to the system memory control bus 181 and the system memory data bus 183, rather than to the ISA bus as shown in FIG. 1. The eight-bit data path from the ROM BIOS 110 is attached to the system memory data bus 182 through a buffer or latch 220, which buffers the data between the ROM BIOS and the system memory bus 118. Normally, eighteen address lines are used for the ROM BIOS, and the ROM BIOS address ports are connected to the system memory address bus over lines 151. The additional lines 152 may be used for control signalling.

Figure 4:
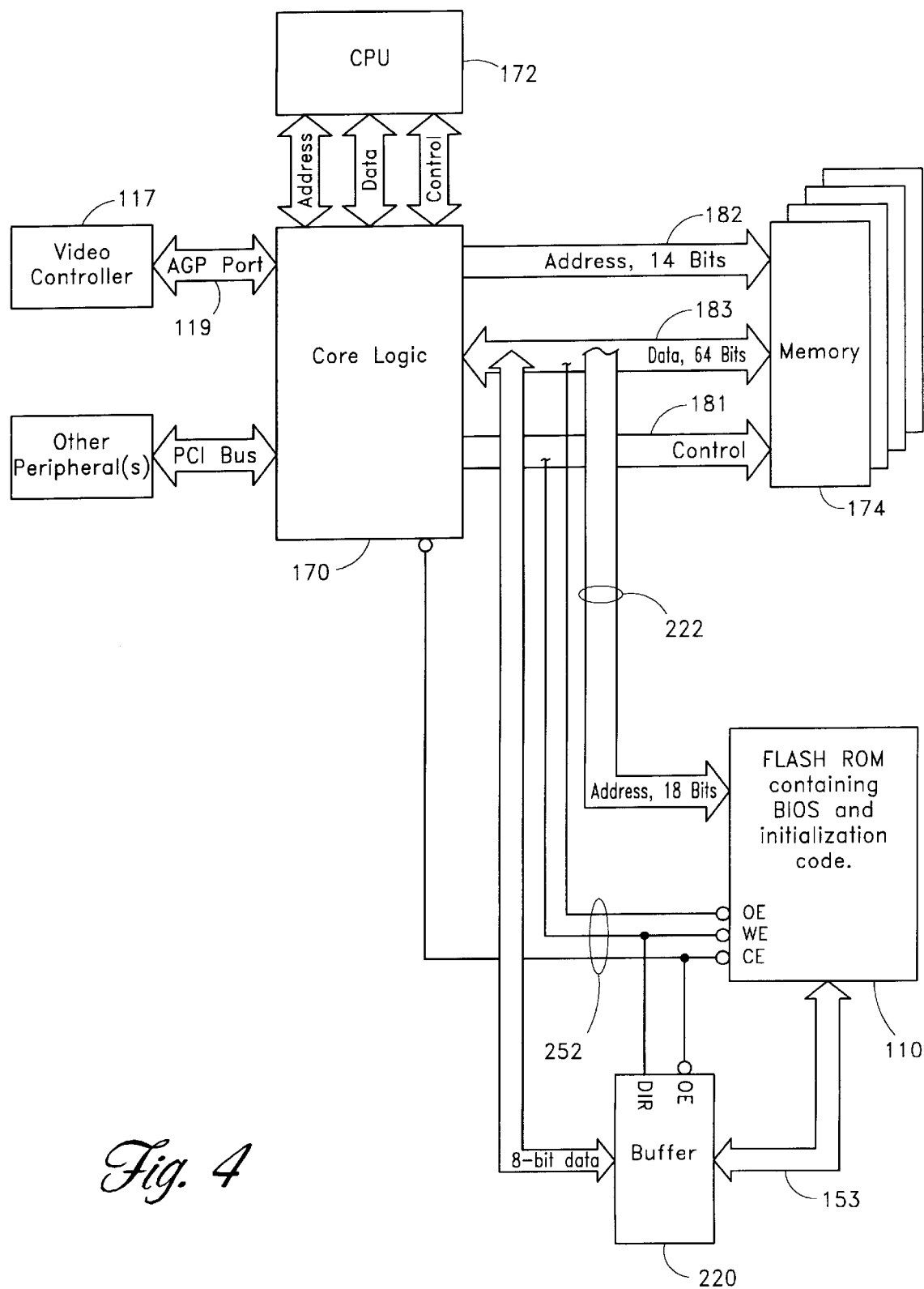
FIG. 4 is a more detailed block diagram of the interface between the ROM BIOS and the system memory bus in FIG. 3.

FIG. 4 is a more detailed block diagram of FIG. 3, where the ROM BIOS 110 is implemented as a FLASH (i.e., non-volatile, electrically-erasable, and programmable) ROM device that contains the BIOS routines and associated initialization code. The core logic 170 controls access to the main memory 174, and interfaces with the video controller 117 through the accelerated graphics port bus 119. The core logic 170 also administers the transfer of data from the ROM BIOS 110. The ROM BIOS addresses are passed from the system memory bus 118 to the ROM BIOS 110 over address lines 222. The address lines 22 that extend to the BIOS device 110 are taken entirely from system memory data bus 183. Data is passed between the ROM BIOS 110 and the core logic 170 over bus 153, through buffer 220, and over the system memory data bus 183. Signals 252 are used to control the transfer of addresses or data to or from the FLASH memory device 110.

In operation, a ROM BIOS access is normally initiated by decoding the address on the system memory bus 118, and allowing any other operations involving the memory bus to be completed. The core logic 170 then accesses the ROM BIOS 110 by placing an address on the system memory data bus 183. In the embodiment shown, an eighteen-bit address is used, and only a portion of the lines on the system memory data bus 183 are used for the address (e.g., lines D0 to D17). Bus 222 communicates the address on the system memory data bus to the to the ROM BIOS 110. After an appropriate period of time (e.g., the ROM BIOS access time), the ROM BIOS 110 responds by placing the addressed data (typically an 8 bit quantity) on bus 153. The data is gated through the buffer 220, and onto a different portion of the system memory data bus 183 (e.g., lines D18 to D25). Thus, the address and data preferably occupy two different portions of the system memory data bus 183. When the access to the ROM BIOS 110 is complete, the chip enable signal is removed and the bus 118 and the core logic 170 return to their normal operating mode.

The control signals shown in FIG. 4 include output enable (OE), write enable (WE), and chip enable (CE) signals. These control signals (as well as any others that are not shown) may be passed to the ROM BIOS on other lines on the system control bus or on the system memory data bus as shown. For example, the WE signal can use the memory WE signal, the OE signal can use another data bit on the memory date bus, and CE could come from the core logic 170. It may be possible to multiplex the BIOS address and/or data on a smaller number of lines on the system memory bus, but since there are typically enough lines available on the bus, it is preferred that different lines be used for address, data, and control signals as described.

The width of the data from the ROM is normally 8 bits, whereas the CPU data path is normally 32 or 64 bits. In some embodiments of the present invention, the core logic 170 sequences the lower address bits presented to the ROM BIOS 110 so that more than one eight-bit quantity can be read from the ROM BIOS. For example, for a 64-bit CPU data path, the core logic 170 can sequence the lower three bits of the ROM address eight times so that eight bytes of data are read from the ROM BIOS 110 in succession, thereby completing a full 64-bit data word. Using this or similar techniques, the core logic 170 is capable of constructing a larger data quantity (e.g., 64 bits) by aggregating multiple eight bit data units from the ROM BIOS. It may also be more efficient in some embodiments for the core logic to construct a full line of data (e.g., four 32-bit quantities or two 64-bit quantities). Other performance-enhancing techniques, such as the shadowing operation described above, could also be used with the present invention, and should be understood to be within the scope of the present invention.

By configuring a computer system as shown in FIGS. 3 and 4, it is possible to attach the ROM BIOS to the system memory bus 118, thereby potentially eliminating the need for the ISA bus. The present invention will therefore reduce system complexity and manufacturing costs, and may also enhance system performance. Although a discrete implementation is shown in FIGS. 3 and 4 using multiple parts, it should be understood that the present invention encompasses implementations and embodiments where some or all of the equivalent logic is integrated into the core logic 170 or into the ROM BIOS or FLASH memory device 110. And although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims.

What is claimed is:

1. A method of accessing a BIOS device in a computer system having a central processing unit, a core logic, a system memory bus that can operate in a normal mode, and a BIOS device on the system memory bus, wherein the system memory bus includes a system memory data bus, the method comprising the acts of:

in the core logic, decoding signals on the system memory bus;

if a BIOS access is desired, preventing the system memory bus from operating in the normal mode;

presenting an address to the BIOS device by having the core logic place the address on the system memory data bus;

in the core logic, receiving data stored in the BIOS device at the address by sampling a different portion of the system memory data bus;

transferring the data to the central processing unit; and then operating the system memory data bus in the normal mode.

2. The method of claim 1, further comprising the act of sequencing a plurality of low-order bits on the address so that data from more than one addressable location is read from the BIOS device before the data is transferred to the central processing unit.

3. The method of claim 2, wherein the BIOS device has contents, further comprising the act of transferring at least some of the contents of the BIOS device to a faster memory at system start-up.

4. A method of executing BIOS instructions in a computer system having a system memory bus with system memory data bus, a BIOS device that is attached to the system memory bus and that has BIOS instructions stored therein, a central processing unit, and a core logic, wherein the system memory bus normally operates in a first mode, the method comprising the acts of:

bypassing the first mode of operation;

having the core logic place an address of the BIOS device on a portion of the system memory data bus so that the address is presented to the BIOS device;

waiting for the BIOS device to place the addressed data on a different portion of the system memory data bus;

reading the addressed data from the BIOS device by sampling the different portion of the system memory data bus;

transferring the data from the BIOS device to the central processing unit; and returning to the first mode of operation.

5. The method of claim 4, further comprising the act of sequencing a plurality of low-order bits on the address presented to the BIOS device so that data from more than one addressable location is read from the BIOS device before the data is transferred to the central processing unit.

6. The method of claim 5, wherein the BIOS device has contents, further comprising the act of transferring at least some of the contents of the BIOS device to a faster memory at system start-up.

7. In a logic device for controlling BIOS operations in a computer system having a system memory bus that includes a system memory data bus, a BIOS device that is attached to the system memory bus and that has BIOS instructions stored therein, a central processing unit, and a core logic, wherein the system memory bus normally operates in a first mode, a method comprising the acts of:

in the core logic, decoding signals on the system memory bus;

if a BIOS access is desired, preventing the system memory bus from operating in the first mode;

waiting for previously-initiated operations on the system memory bus to complete;

presenting an address to the BIOS device by having the core logic place the address on a portion of the system memory data bus, in the core logic, receiving data stored in the BIOS device at the address by sampling a portion of the system memory data bus, transferring the data to the central processing unit; and returning to the first mode of operation.

8. The method of claim 7, further comprising the act of sequencing a plurality of low-order bits on the address so that data from more than one addressable location is read from the BIOS device before the data is transferred to the central processing unit.

9. The method of claim 8, further comprising the act of transferring at least some of the contents of the BIOS device to faster memory at system start-up.

10. The method of claim 9, wherein the act of presenting an address to the BIOS device, and the act of receiving data involve data transfers on different portions of the system memory bus.

11. The method of claim 10, wherein the act of presenting an address to the BIOS device includes the act of presenting an address to a non-volatile, electrically-erasable, programmable read-only memory device.

12. The method of claim 11, wherein the act of receiving data stored in the BIOS device includes the act of receiving eight-bit data units that are stored in an eighteen-bit address space within the non-volatile, electrically-erasable, programmable read-only memory device.

* * * * *